United States Patent
Tanno et al.

(10) Patent No.: US 9,352,523 B2
(45) Date of Patent: May 31, 2016

(54) METHOD FOR MANUFACTURING PNEUMATIC TIRE

(75) Inventors: Atsushi Tanno, Niratsuka (JP); Noboru Takada, Niratsuka (JP); Yuji Sato, Niratsuka (JP); Jun Matsuda, Niratsuka (JP); Yuji Kodama, Niratsuka (JP); Susumu Imamiya, Niratsuka (JP)

(73) Assignee: The Yokohama Rubber Co., LTD. (JP)

( * ) Notice: Subject to any disclaimer, the term of this patent is extended or adjusted under 35 U.S.C. 154(b) by 520 days.

(21) Appl. No.: 13/423,706

(22) Filed: Mar. 19, 2012

(65) Prior Publication Data

US 2012/0299217 A1 Nov. 29, 2012

(30) Foreign Application Priority Data

May 27, 2011 (JP) .................................. 2011-119671

(51) Int. Cl.
*B29D 30/06* (2006.01)
(52) U.S. Cl.
CPC .... *B29D 30/0681* (2013.01); *B29D 2030/0683* (2013.01)
(58) Field of Classification Search
CPC ........... B29D 30/0605; B29D 30/0654; B29D 30/0601; B29D 30/0606; B29D 30/0623; B29D 30/0629; B29D 2030/063; B29D 30/0681; B29D 2030/0683; B29D 2030/105; B29D 30/36; B29D 2030/325; B29D 2030/3242; B29D 2030/2635; B29D 2030/2614; B60C 9/08; B60C 9/2006
USPC ........... 264/326, 328.3, 501, 552, 297.5, 534, 264/531, 523, 503; 425/28.1, 31, 32, 33, 425/35, 46, 47; 156/130.5
See application file for complete search history.

(56) References Cited

U.S. PATENT DOCUMENTS 3,831,656 A * 8/1974 Senger et al. .................. 152/529
3,897,181 A * 7/1975 Madaschefsky ................ 425/47
(Continued)

FOREIGN PATENT DOCUMENTS

CN 1982088 6/2007
DE 2355489 * 11/1973 ................ B60C 9/00
(Continued)

OTHER PUBLICATIONS http://web.archive.org/web/20071012182130/http://en.wikipedia.org/wiki/Young's_modulus; Oct. 12, 2007.*
(Continued)

*Primary Examiner* — James Sanders
*Assistant Examiner* — Leith S Shafi
(74) *Attorney, Agent, or Firm* — Thorpe North & Western

(57) ABSTRACT

A green tire of a pneumatic tire, including a cylindrical annular structure, an unvulcanized rubber layer, which will become a tread portion, provided along a circumferential direction of the annular structure on an outer side of the annular structure, and a carcass portion including fibers covered with rubber, provided on at least both sides in the width direction of a cylindrical structure including the annular structure and the unvulcanized rubber layer, is disposed in a vulcanization mold. The vulcanization mold is split into the side plates and the sector at a position on the inner side in the width direction of the annular structure. Next, the bladder inside the green tire is pressurized after closing the side plates and prior to closing the sector. Then the sector is closed and vulcanization is started.

17 Claims, 6 Drawing Sheets

(56) References Cited

U.S. PATENT DOCUMENTS

| | | | | |
|---|---|---|---|---|
| 4,165,403 A | * | 8/1979 | Alban | 428/140 |
| 5,343,917 A | * | 9/1994 | Okihara et al. | 152/209.18 |
| 5,385,192 A | * | 1/1995 | Hashimura et al. | 152/454 |
| 6,123,784 A | * | 9/2000 | Havette | 148/325 |
| 2007/0131329 A1 | | 6/2007 | Miyazaki | |
| 2008/0156407 A1 | * | 7/2008 | Sakamoto et al. | 152/454 |
| 2010/0116390 A1 | * | 5/2010 | Sevart et al. | 152/209.14 |

FOREIGN PATENT DOCUMENTS

| | | |
|---|---|---|
| EP | 0 836 956 | 4/1998 |
| JP | 51-027205 | 3/1976 |
| JP | 51-072003 | 6/1976 |
| JP | 55-079706 | 6/1980 |
| JP | 63-116308 | 7/1988 |
| JP | 04-356204 | 12/1992 |
| JP | 08-216620 | 8/1996 |
| JP | 08-511738 | 12/1996 |
| JP | 11-179730 | 7/1999 |
| JP | 2003-285331 | 10/2003 |
| JP | 2004-050499 | 2/2004 |

OTHER PUBLICATIONS http://web.archive.org/web/20090209104107/http://en.wikipedia.org/wiki/Yield_(engineering); Feb. 9, 2009.*
DE2355489_Machine_Translation; Apr. 14, 2014.*
http://www.merriam-webster.com/dictionary/fiber; Mar. 23, 2015.*
Akimasa Doi, "Recent Technical Trends in Tires"; Journal of the Society Journal of the Society of Rubber Industry, vol. 71; Sep. 1998; pp. 588-594.
Japanese Decision of Patent, dated Apr. 23, 2013, 2 pages, Japan.

* cited by examiner

METHOD FOR MANUFACTURING PNEUMATIC TIRE

PRIORITY CLAIM

Priority is claimed to Japan Patent Application Serial No. 2011-119671 filed on May 27, 2011.

BACKGROUND

1. Technical Field

The present technology relates to a method for manufacturing a pneumatic tire and a pneumatic tire.

2. Related Art

Reducing the rolling resistance of a pneumatic tire is useful for improving the fuel consumption of a vehicle. Techniques exist for reducing the rolling resistance of a tire such as, for example, using a silica-compounded rubber for the tread.

While the technique for reducing the rolling resistance of pneumatic tires described in Recent Technical Trends in Tires, Akimasa DOI, Journal of the Society of Rubber Industry, September 1998, Vol. 71, p. 588-594 provides an improvement to the material, it is also possible to reduce the rolling resistance by modifying the structure of the pneumatic tire.

SUMMARY

The present technology provides a method for manufacturing a pneumatic tire whereby rolling resistance is reduced by changing the structure thereof. The method for manufacturing a pneumatic tire according to an example of the present technology includes the following steps: disposing a green tire of a pneumatic tire comprising a cylindrical annular structure, an unvulcanized rubber layer, which will become a tread portion, provided along a circumferential direction of the annular structure on an outer side of the annular structure, and a carcass portion including fibers covered with rubber, provided on at least both sides in the width direction of the cylindrical structure including the annular structure and the unvulcanized rubber layer, in a vulcanization mold having side plates and a sector split at a position on an inner side in a width direction of the annular structure; pressurizing a bladder inside the green tire after closing the side plates and prior to closing the sector; and closing the sector and starting vulcanization.

In the present technology, it is preferable that the annular structure is embedded in the unvulcanized rubber layer and is not exposed from a surface on an outer side in the radial direction of the unvulcanized rubber layer.

In the present technology, in a meridian cross-section of the tread portion when the pneumatic tire is inflated to a predetermined air pressure, a contour form of the pneumatic tire preferably includes an arc, recessed toward an inner side of the pneumatic tire, in a region from an end portion of the annular structure on an outer side in the width direction to 15 mm toward the outer side in the width direction.

The present technology can provide a method for manufacturing a pneumatic tire whereby rolling resistance is reduced by changing the structure thereof.

BRIEF DESCRIPTION OF THE DRAWINGS

FIG. 2-1 is a perspective view of an annular structure included in the tire according to the embodiment.

FIG. 2-2 is a plan view of an annular structure included in the tire according to the embodiment.

DETAILED DESCRIPTION

Figure 1:
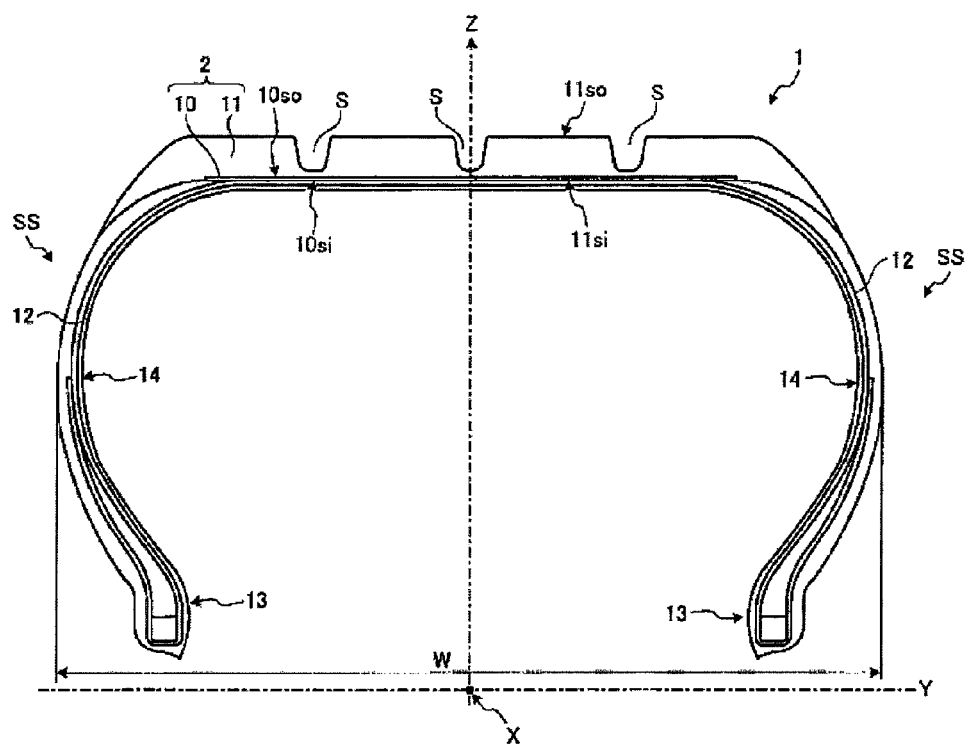
FIG. 1 is a meridian cross-sectional view of a tire according to an embodiment.

Forms of the present technology (embodiments) are described below in detail while referring to the drawings. However, the present technology is not limited to the descriptions given in the embodiments. Additionally, the constituents described below include those constituents that could be easily conceived by a person skilled in the art, constituents that are essentially identical to those described herein, and constituents that are in an equivalent range thereof. Furthermore, it is possible to combine the constituents described below as desired. Moreover, various omissions, substitutions, and changes of the constituents can be carried out within the scope of the embodiment.

When eccentric deformation is increased to a limit thereof in order to reduce the rolling resistance of a pneumatic tire (hereinafter referred to as "tire" as necessary), ground contact area between the tire and a road surface decreases and ground contact pressure increases. As a result, viscoelastic energy loss, caused by deformations of a tread portion, increases, leading to an increase in rolling resistance. The present inventors focused on this point and attempted to reduce rolling resistance and enhance steering stability by ensuring the ground contact area between the tire and the road surface and maintaining eccentric deformation. Eccentric deformation is a single-dimensional mode of deformation in which a tread ring (crown region) of the tire shifts vertically while the round form of the tire is maintained. In order to ensure ground contact area between the tire and the road surface and maintain eccentric deformation, the tire according to this embodiment uses, for example, a structure including a cylindrical annular structure that is manufactured from a thin plate of a metal. A rubber layer is provided along a circumferential direction of the annular structure on an outer side of the annular structure. This rubber layer constitutes the tread portion of the tire.

Figures 1, 2:
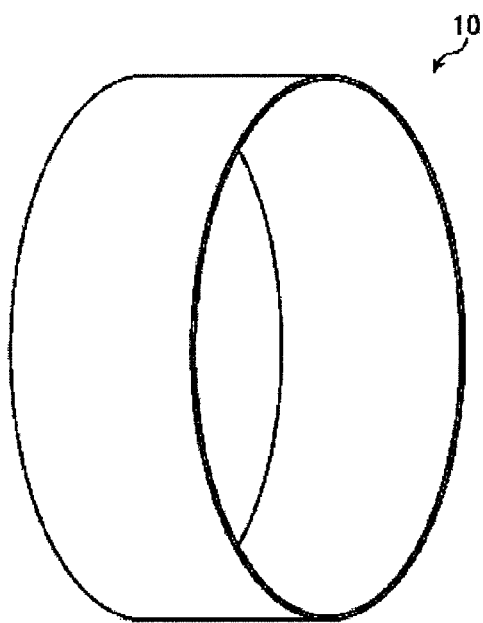
Figure 2:
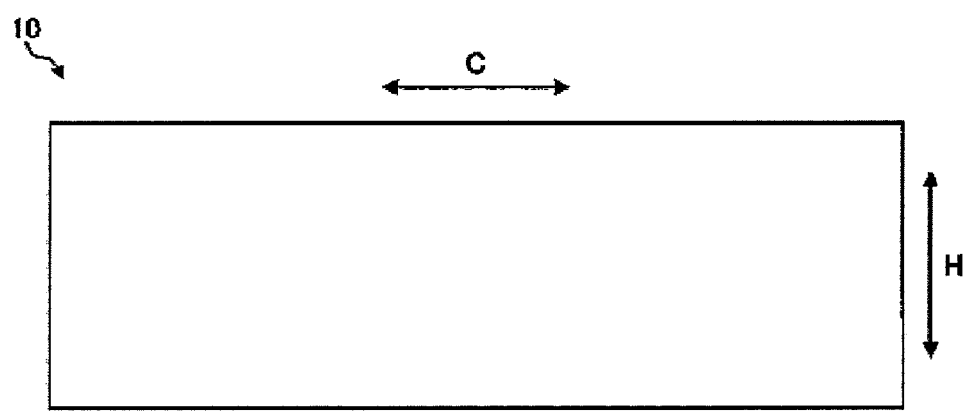
Figure 3:
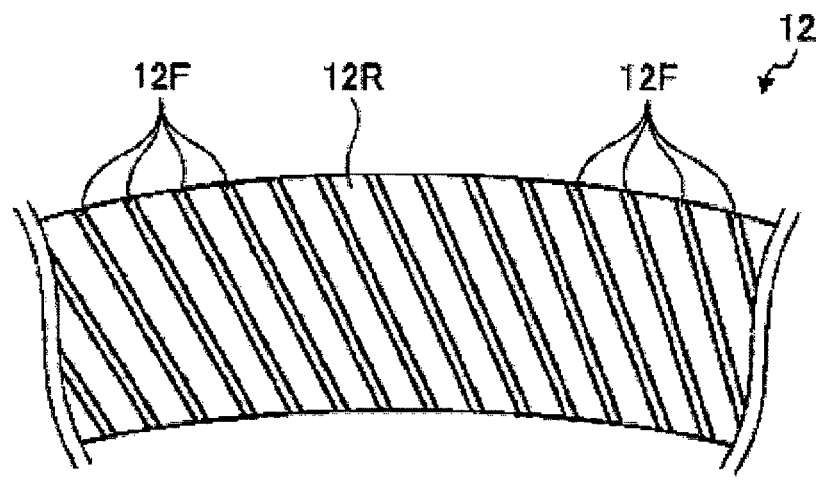
FIG. 3 is an enlarged view of a carcass portion included in the tire according to the embodiment.

FIG. 1 is a meridian cross-sectional view of a tire according to an embodiment. FIG. 2-1 is a perspective view of an annular structure included in the tire according to the embodiment. FIG. 2-2 is a plan view of an annular structure included in the tire according to the embodiment. FIG. 3 is an enlarged view of a carcass portion included in the tire according to the embodiment. As illustrated in FIG. 1, the tire 1 is an annular structure. An axis that passes through a center of the annular structure is a center axis (Y-axis) of the tire 1. When in use, an interior of the tire 1 is filled with air.

The tire 1 rotates having the center axis (Y-axis) as a rotational axis. The Y-axis is the center axis and the rotational axis of the tire 1. An X-axis is an axis that is orthogonal to the Y-axis (the center axis (rotational axis) of the tire 1), and is parallel to a road surface that the tire 1 makes ground contact with. A Z-axis is an axis that is orthogonal to the Y-axis and the X-axis. A direction that is parallel to the Y-axis is a width direction of the tire 1. A direction that passes through the Y-axis and is orthogonal to the Y-axis is a radial direction of the tire 1. Additionally, a circumferential direction centered on the Y-axis is a circumferential direction of the pneumatic tire 1 (the direction indicated by the arrow "CR" in FIG. 1).

As illustrated in FIG. 1, the tire 1 includes a cylindrical annular structure 10, a rubber layer 11, and a carcass portion 12. The annular structure 10 is a cylindrical member. The rubber layer 11 is provided along the circumferential direction of the annular structure 10 on a surface 10so on the outer side in the radial direction of the annular structure 10, and constitutes the tread portion of the tire 1. As illustrated in FIG. 3, the carcass portion 12 includes fibers 12F covered by rubber 12R. In this embodiment, as illustrated in FIG. 1, the carcass portion 12 is provided on an inner side in the radial direction of the annular structure 10 and connects both bead portions 13. In other words, the carcass portion 12 is continuous between both of the bead portions 13 and 13. Note that while the carcass portion 12 is provided on both sides in the width direction of the annular structure 10, the carcass portion 12 need not be continuous between both of the bead portions 13 and 13. Thus, as illustrated in FIG. 3, it is sufficient that the carcass portion 12 be provided on both sides in the direction (the width direction) parallel to the center axis (Y-axis) of a cylindrical structure 2 that includes at least the annular structure 10 and the rubber layer 11.

In the tire 1, in a meridian cross-section of the structure 2, an outer side 11 so (tread surface of the tire 1) of the rubber layer 11 and the surface 10so on the outer side in the radial direction of the annular structure 10, except portions where a groove S is formed in the tread surface, preferably have the same form, and are parallel (including allowance and tolerance).

The annular structure 10 illustrated in FIGS. 2-1 and 2-2 is a metal structure. In other words, the annular structure 10 is made from a metal material. The metal material used for the annular structure 10 preferably has a tensile strength of not less than 450 N/m$^2$ and not more than 2,500 N/m$^2$, more preferably not less than 600 N/m$^2$ and not more than 2,400 N/m$^2$, and even more preferably not less than 800 N/m$^2$ and not more than 2,300 N/m$^2$. When the tensile strength is within the range described above, sufficient strength and rigidity of the annular structure 10 can be ensured, and necessary toughness thereof can be ensured. It is sufficient that the tensile strength of the metal material that can be used for the annular structure 10 be within the range described above, but preferably spring steel, high tensile steel, stainless steel, or titanium (including titanium alloy) is used. Of these, stainless steel is preferable because stainless steel has high corrosion resistance and stainless steel with a tensile strength that is within the range described above can be obtained easily.

A pressure resistance parameter is defined as a product of the tensile strength (MPa) and the thickness (mm) of the annular structure 10. The pressure resistance parameter is a parameter by which resistance against internal pressure of the gas (e.g. air, nitrogen, or the like) that the tire 1 is filled with is measured. The pressure resistance parameter is set to be not less than 200 and not more than 1,700 and preferably not less than 250 and not more than 1,600. When within this range, a maximum usage pressure of the tire 1 can be ensured, and safety can be sufficiently ensured. Additionally, when within the range described above, it is not necessary to increase the thickness of the annular structure 10, and it is also not necessary to use a material with a high breaking strength, which is preferable for mass production. Durability against repeated bending can be ensured for the annular structure 10 because it is not necessary to increase the thickness of the annular structure 10. Additionally, the annular structure 10 and the tire 1 can be manufactured at a low cost because it is not necessary to use a material with a high breaking strength. When used as a passenger car tire (PC tire), the pressure resistance parameter is preferably not less than 200 and not more than 1,000, and more preferably not less than 250 and not more than 950. When used as a light truck tire (LT tire), the pressure resistance parameter is preferably not less than 300 and not more than 1,200, and more preferably not less than 350 and not more than 1,100. When used as a truck/bus tire (TB tire), the pressure resistance parameter is preferably not less than 500 and not more than 1,700, and more preferably not less than 600 and not more than 1,600.

When manufacturing the annular structure 10 from stainless steel, it is preferable to use a JIS (Japanese Industrial Standards) G4303-classified martensitic stainless steel, ferritic stainless steel, austenitic stainless steel, austenitic-ferritic two-phase stainless steel, or precipitation hardening stainless steel. By using such a stainless steel, an annular structure 10 having superior tensile strength and toughness can be obtained. Additionally, of the stainless steels described above, precipitation hardening stainless steel (SUS631 or SUS632J1) is more preferable.

The annular structure 10 has a plurality of through-holes that penetrates an inner circumferential surface and an outer periphery thereof. The rubber layer 11 is attached to the outer side in the radial direction and/or the inner side in the tire radial direction of the annular structure 10. The rubber layer 11 is attached to the annular structure 10 via chemical bonding with the annular structure 10. The through-holes provide an effect of strengthening the physical bond between the annular structure 10 and the rubber layer 11. Therefore, bonding strength with the rubber layer 11 is increased by chemical and physical effects (anchoring effects) and, as a result, the annular structure 10 including the through-holes is reliably affixed to the rubber layer 11. This leads to an enhancement in the durability of the tire 1.

A cross-sectional area of one of the through-holes is preferably not less than 0.1 mm$^2$ and not more than 100 mm$^2$, more preferably not less than 0.12 mm$^2$ and not more than 80 mm$^2$, and even more preferably not less than 0.15 mm$^2$ and not more than 70 mm$^2$. When within this range, unevennesses in the carcass portion 12 are suppressed, and bonding by adhesion, specifically, chemical bonding can be sufficiently used. Furthermore, when within the range described above, the physical effect described above, specifically the anchoring effect, is most effective. Due to these effects, the bond between the annular structure 10 and the rubber layer 11 can be strengthened.

When the annular structure 10 has the through-holes, a form thereof is not limited, but a circular or elliptical form is preferable. Additionally, an equivalent diameter 4×A/C of the through-holes (where C is a circumferential length of the through-holes, and A is the opening area of the through-holes) is preferably not less than 0.5 mm and not more than 10 mm. The through-holes more preferably have a circular form and a diameter of not less than 1.0 mm and not more than 8.0 mm. When within this range, physical and chemical bonding can be used effectively and, therefore, the bond between the annular structure 10 and the rubber layer 11 will be stronger. As described hereinafter, the equivalent diameter or diameter of all of the through-holes need not be the same.

A sum of the area of the through-holes is preferably not less than 0.5% and not more than 30%, more preferably not less than 1.0% and not more than 20%, and even more preferably not less than 1.5% and not more than 15% of a surface area of the outer side in the radial direction of the annular structure 10. When within this range, strength of the annular structure 10 can be ensured while physical and chemical bonding are used effectively. As a result, the bond between the annular structure 10 and the rubber layer 11 will be stronger and necessary rigidity of the annular structure 10 can be ensured. Note that spacing of the through-holes may be equal or unequal. By using such a configuration, the footprint of the tire 1 can be controlled.

The annular structure 10 can be manufactured by abutting short sides of a rectangular plate material or a rectangular plate material in which the plurality of through-holes have been punched, and then welding. Thus, the annular structure 10 can be manufactured in a comparatively simple manner. Note that the method for manufacturing the annular structure 10 is not limited to this and, for example, the annular structure 10 may be manufactured by forming a plurality of holes in the outer peripheral portion of a cylinder and, thereafter, milling an interior of the cylinder.

The surface 10so on the outer side in the radial direction of the annular structure 10 and an inner side 11si of the rubber layer 11 are in contact with each other. In this embodiment, the annular structure 10 and the rubber layer 11 are affixed using, for example, an adhesive. As a result of such a structure, force can be transferred mutually between the annular structure 10 and the rubber layer 11. Means for affixing the annular structure 10 and the rubber layer 11 are not limited to adhesives. Additionally, the annular structure 10 preferably is not exposed to the outer side in the radial direction of the rubber layer. Such a configuration will lead to the annular structure 10 and the rubber layer 11 being more reliably affixed. Furthermore, the annular structure 10 may be embedded in the rubber layer 11. In such a case as well, the annular structure 10 and the rubber layer 11 can be more reliably bonded.

The rubber layer 11 includes a rubber material including a synthetic rubber, a natural rubber, or a mixture thereof; and carbon, $SiO_2$ or the like, which is added to the rubber material as a reinforcing material. The rubber layer 11 is an endless belt-like structure. As illustrated in FIG. 1, in this embodiment, the rubber layer 11 has a plurality of grooves (main grooves) S in an outer side 11so. The rubber layer 11 may also have lug grooves in addition to the grooves S.

The carcass portion 12 is a strengthening member that, together with the annular structure 10, fulfills a role as a pressure vessel when the tire 1 is filled with air. The carcass portion 12 and the annular structure 10 support the load that acts on the tire 1 due to the internal pressure of the air that fills the interior of the tire 1, and withstand dynamic loads received by the tire 1 during traveling. In this embodiment, an inner liner 14 is provided on an inner side of the carcass portion 12 of the tire 1. The inner liner 14 suppresses the air filling the interior of the tire 1 from leaking. Each end of the carcass portion 12 has a bead portion 13 on the inner side thereof in the radial direction. The bead portions 13 mate with a rim of a wheel on which the tire 1 is attached. Note that the carcass portion 12 may mechanically bond with the rim of the wheel.

Figure 4:
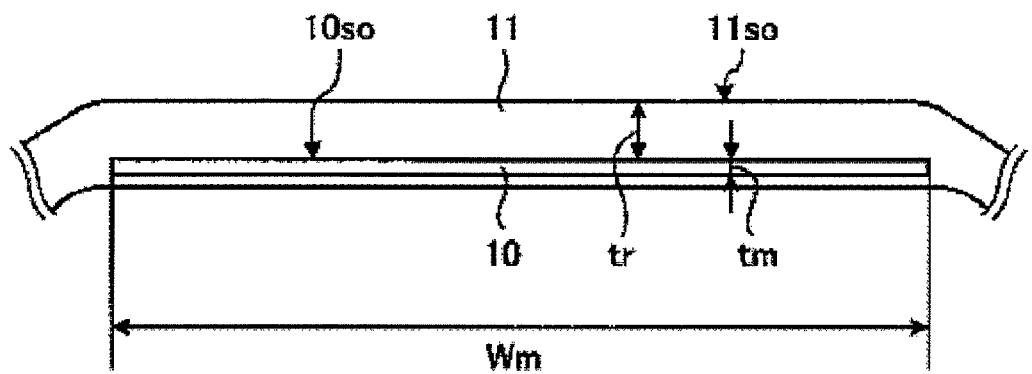
FIG. 4 is a meridian cross-sectional view of the annular structure and a rubber layer.

FIG. 4 is a meridian cross-sectional view of the annular structure 10 and the rubber layer 11. An elastic modulus of the annular structure 10 is preferably not less than 70 GPa and not more than 250 GPa, and more preferably not less than 80 GPa and not more than 230 GPa. Additionally, a thickness tm of the annular structure 10 is preferably not less than 0.1 mm and not more than 0.8 mm. When within this range, durability against repeated bending can be ensured while ensuring pressure resistance performance. A product of the elastic modulus and the thickness tm of the annular structure 10 (referred to as the "rigidity parameter") is preferably not less than 10 and not more than 500, and more preferably not less than 15 and not more than 400.

By configuring the rigidity parameter to be within the range described above, rigidity of the annular structure 10 in the meridian cross-section increases. As a result, when the tire 1 is filled with air and when the tire 1 makes ground contact with a road surface, deformations caused by the annular structure 10 in the meridian cross-section of the rubber layer 11 (tread portion) are suppressed. Therefore, viscoelastic energy loss of the tire 1 caused by the deformations is suppressed. Additionally, by configuring the rigidity parameter to be within the range described above, rigidity of the annular structure 10 in the radial direction decreases. As a result, the tread portion of the tire 1 pliably deforms at a ground contact portion between the tire 1 and the road surface, just as with conventional pneumatic tires. Due to such a function, the tire 1 eccentrically deforms while localized concentrations of strain and stress in the ground contact portion are avoided and, therefore, strain in the ground contact portion can be dispersed. Therefore, localized deformation of the rubber layer 11 in the ground contact portion is suppressed, resulting in ground contact area of the tire 1 being ensured and rolling resistance being reduced.

Furthermore, with the tire 1, the in-plane rigidity of the annular structure 10 is great and the ground contact area of the rubber layer 11 can be ensured. Therefore, ground contact length in the circumferential direction can be ensured. This results in an increase in lateral forces that are generated when a rudder angle is input to the tire 1. As a result, the tire 1 can obtain high cornering power. Additionally, when the annular structure 10 is manufactured from a metal, most of the air that the interior of the tire 1 is filled with will not pass through the annular structure 10. This is beneficial as it simplifies managing the air pressure of the tire 1. Therefore, declines in the air pressure of the tire 1 can be suppressed even when usage of the tire 1 is such that the tire 1 is not filled with air for an extended period of time.

A distance tr (thickness of the rubber layer 11) between the surface 10so on the outer side in the radial direction of the annular structure 10 and the outer side 11so of the rubber layer 11 is preferably not less than 3 mm and not more than 20 mm. By configuring the distance tr to be within such a range, excessive deformation of the rubber layer 11 when cornering can be suppressed while ensuring riding comfort. The direction parallel to the center axis (Y-axis) of the annular structure 10 or, in other words, a dimension Wm (annular structure width) in the width direction of the annular structure 10 is preferably not less than 50% (W×0.5) and not more than 95% (W×0.95) of the total width W (in a state where the tire 1 is assembled on a wheel having a rim width stipulated in JATMA (Japan Automobile Tyre Manufacturers Association) and inflated with air to 300 kPa) in the direction parallel to the center axis (Y-axis) of the tire 1 illustrated in FIG. 1. If Wm is less than W×0.5, rigidity in the meridian cross-section of the annular structure 10 will be insufficient, resulting in a reduction of the region that maintains eccentric deformation with respect to the tire width. As a result, the effect of reducing rolling resistance may decline and cornering power may decrease. Moreover, if Wm exceeds W×0.95, the tread portion may cause buckling deformation in the center axis (Y-axis) direction of the annular structure 10 when making ground contact, and this may lead to the deformation of the annular structure 10. By configuring Wm so that W×0.5≤Wm≤W×0.95, cornering power can be maintained while rolling resistance is reduced and, furthermore, deformation of the annular structure 10 can be suppressed.

With the tire 1, in the meridian cross-section illustrated in FIG. 1, the outer side 11so of the rubber layer 11 or, in other words, the profile of the tread surface, except the portions where the groove S is formed, preferably has the same form as the surface 10so on the outer side in the radial direction of the annular structure 10. As a result of such a configuration, when the tire 1 makes ground contact or is rolling, the rubber layer 11 (tread portion) and the annular structure 10 deform in substantially the same manner. Therefore, deformation of the rubber layer 11 of the tire 1 is reduced, and this leads to a reduction in viscoelastic energy loss and a further reduction in rolling resistance.

If the outer side 11so of the rubber layer 11 and the surface 10so on the outer side in the radial direction of the annular structure 10 protrude facing outward in the radial direction of the tire 1 or, alternately protrude facing inward in the radial direction of the tire 1, pressure distribution in the ground contact portion of the tire 1 will become uneven. As a result, localized concentrations of strain and stress may be generated in the ground contact portion, and localized deformation of the rubber layer 11 may occur in the ground contact portion. In this embodiment, in tire 1, as illustrated in FIG. 3, the outer side 11so of the rubber layer 11 (the tread surface of the tire 1) and the surface 10so on the outer side in the radial direction of the annular structure 10 have the same form (preferably parallel) and, furthermore, preferably are parallel (including allowance and tolerance) to the center axis (Y-axis) of the rubber layer 11 and the annular structure 10 (i.e. the structure 2). Due to such a structure, the ground contact portion of the tire 1 can be configured to be substantially flat. With the tire 1, pressure distribution in the ground contact portion is uniform and, therefore, localized concentration of strain and stress in the ground contact portion is suppressed and localized deformation of the rubber layer 11 in the ground contact portion is suppressed. As a result, viscoelastic energy loss is reduced and, therefore, rolling resistance of the tire 1 is also reduced. Additionally, with the tire 1, localized deformation of the rubber layer 11 in the ground contact portion is suppressed and, therefore, the ground contact area can be ensured and, simultaneously, the ground contact length in the tire circumferential direction can be ensured. Therefore, with the tire 1, cornering power can also be ensured.

In this embodiment, the form of the rubber layer 11 in the meridian cross-section is not particularly limited provided that the outer side 11so of the rubber layer 11 and the surface 10so on the outer side in the radial direction of the annular structure 10 are parallel to the center axis (Y-axis). For example, the form of the rubber layer 11 in a meridian cross-section may be a trapezoidal shape or a parallelogram shape. When the form of the rubber layer 11 in the meridian cross-section is trapezoidal, an upper bottom or a lower bottom of the trapezoid may be the outer side 11so of the rubber layer 11. In either case, it is sufficient that only the portion of the annular structure 10 be parallel to the profile (except the portions where the groove is formed) of the tread surface of the tire 1.

Figure 5:
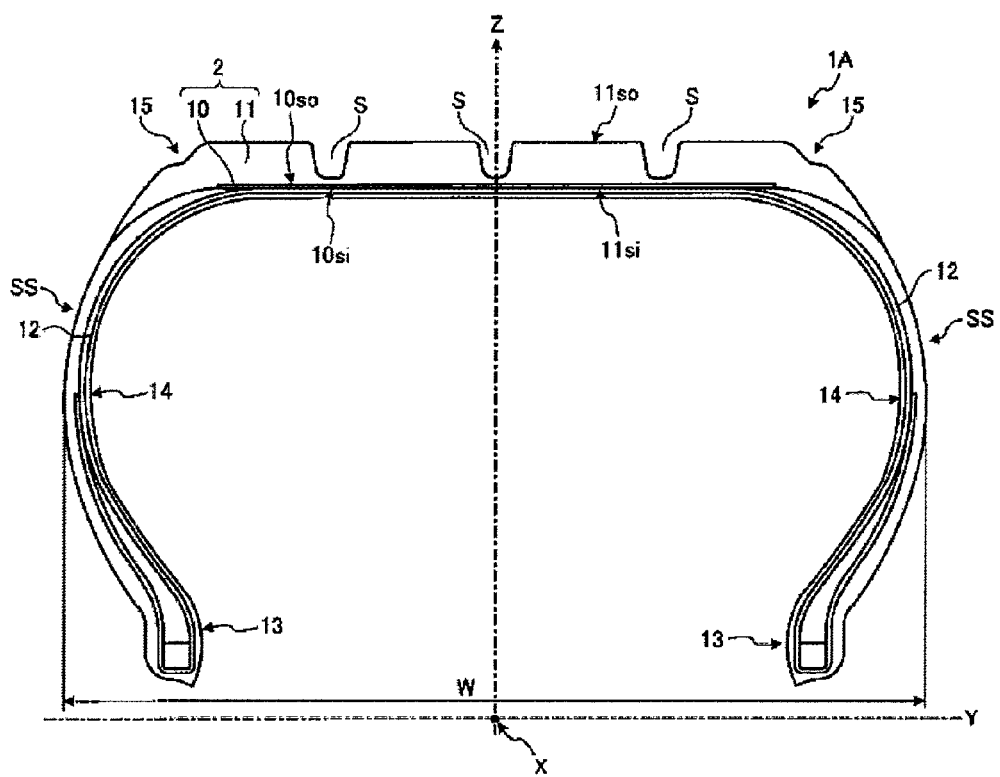
FIG. 5 is a meridian cross-sectional view illustrating a tire according to a modified example of the embodiment.

FIG. 5 is a meridian cross-sectional view illustrating a tire according to a modified example of the embodiment. When viewed as a meridian cross-section, a form of a tread surface of a tire 1A at the outer side in the width direction (specifically, between the contact patch of the rubber layer 11 and a side portion SS of the tire 1) is recessed toward the inner side of the tire 1. That is, in the tire 1, thickness of the rubber layer 11 on the outer side in the width direction is less than that on the inner side in the width direction. By configuring the form of the tread surface of the tire 1 and the rubber layer 11 as described above, cornering power can be ensured while reducing rolling resistance.

In a meridian cross-section of the tread portion when the tire 1 is inflated to a predetermined air pressure, a contour form of the tire 1 includes an arc 15, recessed toward an inner side of the tire 1, in a region from an end portion 10t of the annular structure 10 on an outer side in the width direction to 15 mm toward the outer side in the width direction. The arc 15 has a center on the outer side in the radial direction and the outer side in the width direction of the tire 1. A curvature radius of the arc is preferably not less than 3 mm and not more than 150 mm, more preferably not less than 5 mm and not more than 100 mm, and most preferably not less than 8 mm and not more than 70 mm. When configured as described above, an amount of rubber of the end portion on the outer side in the width direction of the annular structure 10 will be appropriate and, thus, greater cornering power can be ensured. The predetermined air pressure is an air pressure measured when the tire 1A is assembled on a wheel having a rim width stipulated in JATMA, and is 300 kPa.

Figure 6:
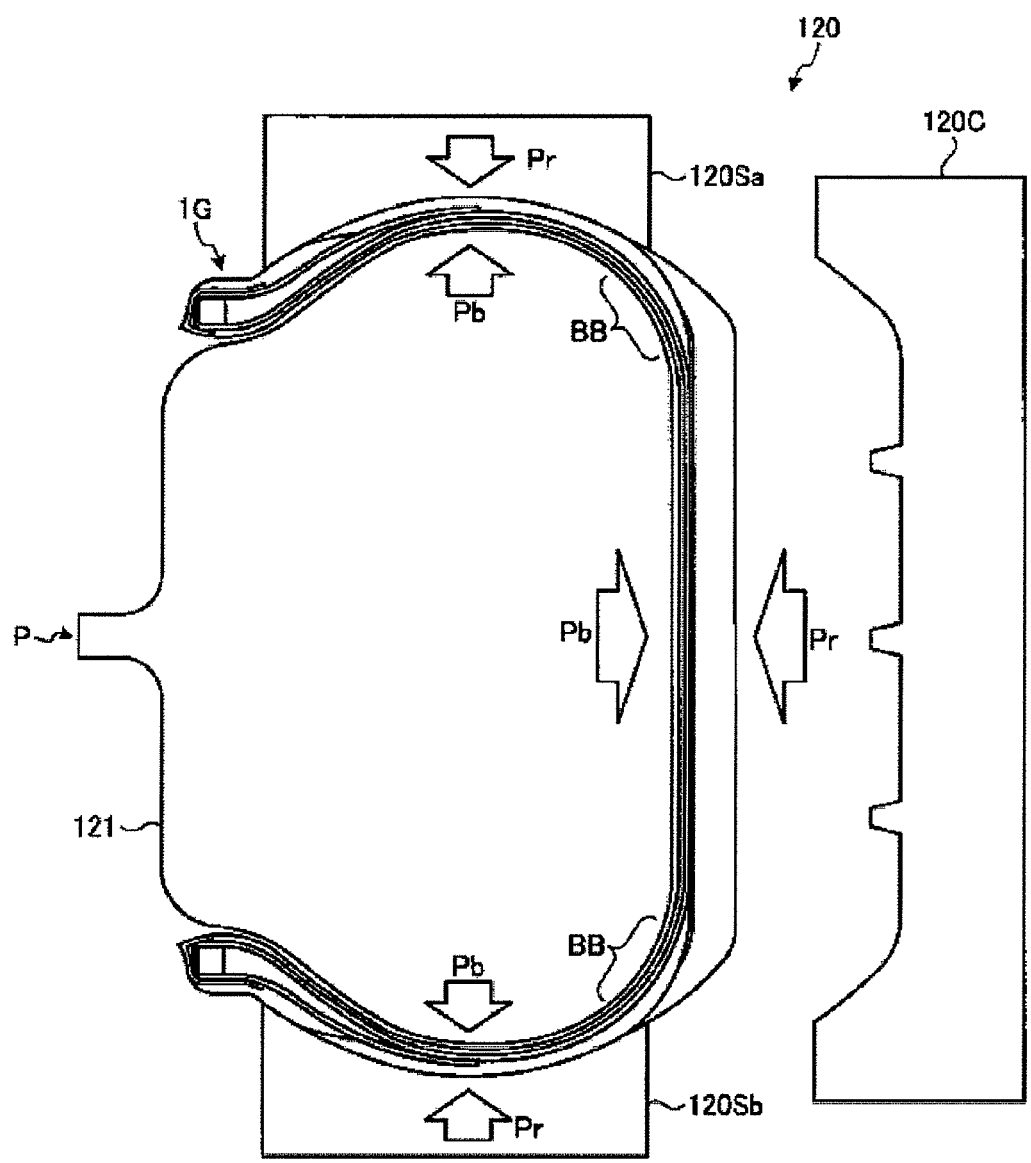
FIG. 6 is a drawing illustrating an example of manufacturing a tire according to the embodiment and the modified example thereof, using a conventional vulcanization mold.
Figure 7:
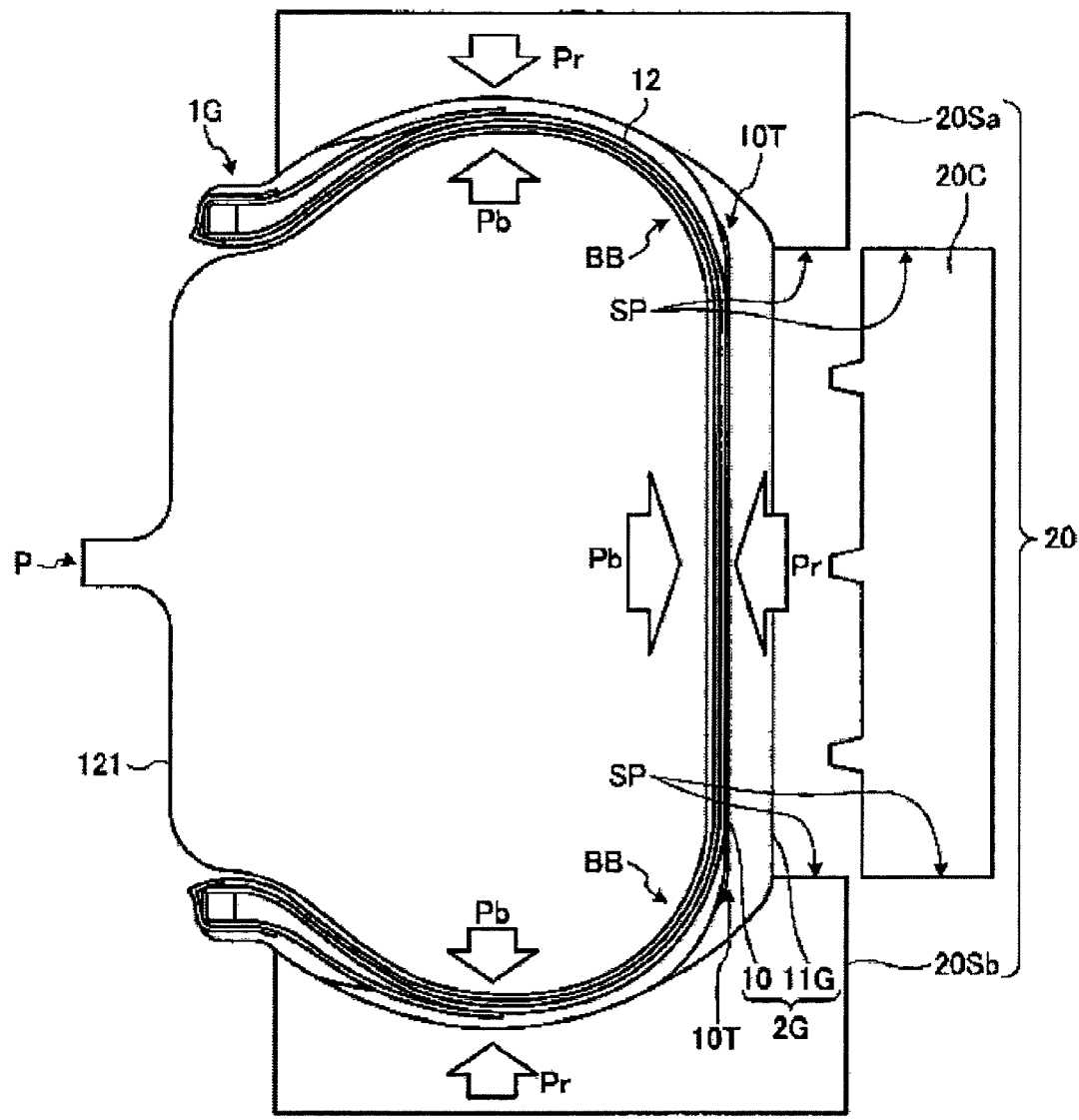
FIG. 7 is a drawing illustrating an example of manufacturing a tire according to the embodiment and the modified example thereof, using a vulcanization mold according to the embodiment.

FIG. 6 is a drawing illustrating an example of manufacturing a tire according to the embodiment and the modified example thereof, using a conventional vulcanization mold. FIG. 7 is a drawing illustrating an example of manufacturing a tire according to the embodiment and the modified example thereof, using a vulcanization mold according to the embodiment. To date, with tires where angled steel wires arranged in parallel and covered by rubber are laminated, the tire itself expands a certain percentage due to a vulcanization bladder expanding and contacting the tire from the tire inner side during vulcanization, thereby pressing the tire against an outer side vulcanization mold. Therefore, vulcanization is carried out via the actions of pressure and heat. However, the annular structure 10 included in the tires 1 and 1A according to this embodiment has extremely high elastic moduli in the tensile (expanding) direction and, therefore, the amount of expansion of the tire itself due to the pressure of the bladder is small. Therefore, in contrast with tires heretofore where green tires are molded using a short circumferential length with respect to the dimensions of the vulcanization mold, with the tires according to this embodiment, a green tire 1G is molded having greater dimensions (dimensions close to the dimensions of the vulcanization mold).

When manufacturing the tires 1 and 1A that use the thin-plate cylindrical annular structure 10, as illustrated in FIG. 6, a green tire 1G having dimensions (outer circumferential length) greater than those of conventional tires is molded and vulcanized because lift does not act on the annular structure 10. When using a conventional vulcanization mold 120 as illustrated in FIG. 6, there has been a possibility of the annular structure 10 buckling in the radial direction when a sector 120C is closed after side plates 120Sa and 120Sb are closed. That is, when the sector 120C closes after the green tire 1G is placed in the vulcanization mold 120, a portion of the sector 120C that forms the grooves (i.e. the protrusions) contacts the tread portion of the green tire 1G and, in this state, applies more pressure than needed to the inner side of the tread portion. This is because the rubber flow cannot keep up and, as a result, there is a possibility that the annular structure 10 may buckle in the radial direction.

As a countermeasure, there is a method in which a bladder 121 is pressurized before the sector 120C closes, but in this case, pressure is applied to the green tire 1G prior to vulcanization. With the tires 1 and 1A according to this embodiment, the side plates 120Sa and 120Sb are closed and, therefore, a counter force Pr with respect to a pressure Pb of the bladder 121 is generated. Additionally, because the annular structure 10 is a cylinder with a high elastic modulus, the counter force Pr is generated by the circumferential direction tensile rigidity thereof. However, the green tire 1G in an unvulcanized state cannot withstand the pressure Pb, and blowouts may occur because the counter force Pr cannot be obtained in a buttress portion BB of the green tire 1G.

Therefore, with the method for manufacturing a pneumatic tire according to this embodiment, as illustrated in FIG. 7, using a vulcanization mold 20 in which a split position of a sector 20C and side plates 20Sa and 20Sb is changed to an appropriate position, a bladder 21 is pressurized before the sector 20C closes. For example, after the side plates 20Sa and 20Sb are closed and prior to the sector 20C closing, the pressure of the bladder 21 is raised 0.2 MPa to 2.0 MPa and preferably 0.3 MPa to 1.0 MPa. As a result, buckling of the annular structure 10 and blowouts from the buttress portion BB of the green tire 1G when vulcanizing can be avoided.

The vulcanization mold 20 has a sector 20C, and side plates 20Sa and 20Sb, each disposed vertically. The sector 20C is split into multiple portions in the circumferential direction. The side plates 20Sa and 20Sb are continuous donut-like disks. A split position SP of the sector 20C and the side plates 20Sa and 20Sb is a position on an inner side in the width direction of the annular structure 10 included in the green tire 1G. As a result, when the green tire 1G is subjected to pressure from a bladder 21, the counter force Pr can be obtained from the side plates 20Sa and 20Sb even in the buttress portion BB and, therefore, blowouts can be avoided.

The split positions SP between the sector 20C and the side plates 20Sa and 20Sb on the outer side in the width direction of the annular structure define a width which is preferably a width not less than 70% and not more than 100%, and more preferably not less than 80% and not more than 99.5% of an annular structure width Wm from the end portion 10t on the outer side in the width direction of the annular structure 10. As a result, the counter force Pr from the side plates 20Sa and 20Sb can be reliably obtained and, therefore, blowouts caused by the pressure Pb of the bladder 21 can be reliably avoided.

With the method for manufacturing a pneumatic tire according to this embodiment, first, a green tire 1G of a pneumatic tire, including a cylindrical annular structure 10, an unvulcanized rubber layer 11G, which will become a tread portion, provided along a circumferential direction of the annular structure 10 on an outer side of the annular structure 10, and a carcass portion 12 including fibers covered with rubber, provided on at least both sides in the width direction of a cylindrical structure 2G including the annular structure 10 and the unvulcanized rubber layer 11G, is disposed in a vulcanization mold 20. The vulcanization mold 20 is split into the side plates 20Sa and 20Sb and the sector 20C at a position on the inner side in the width direction of the annular structure.

The annular structure 10 preferably is not exposed from the outer side in the radial direction of the unvulcanized rubber layer 11G. Such a configuration will lead to more reliable bonding being possible, via vulcanization, between the annular structure 10 and the unvulcanized rubber layer 11G and more reliable bonding between the annular structure 10 and the rubber layer 11 of the tires 1 and 1A. Furthermore, the annular structure 10 may be embedded in the unvulcanized rubber layer 11G. Such a configuration will also lead to more reliable bonding being possible between the annular structure 10 and the unvulcanized rubber layer 11G and the rubber layer 11.

Next, the bladder 21 inside the green tire 1G is pressurized after closing the side plates 20Sa and 20Sb and prior to closing the sector 20C. Then the sector 20C is closed and vulcanization is started. As a result, with the method for manufacturing a pneumatic tire according to this embodiment, buckling of the annular structure 10 and blowouts from the buttress portion BB of the green tire 1G when vulcanizing can be avoided. Thus, with the method for manufacturing a pneumatic tire according to this embodiment, tires 1 and 1A whereby rolling resistance is reduced by changing the structure thereof can be manufactured.

In order to ensure cornering power while reducing rolling resistance, the thickness of the rubber layer 11 near the outer side in the width direction of the annular structure 10 of the tire 1A illustrated in FIG. 5 is reduced. The method for manufacturing a pneumatic tire according to this embodiment is particularly effective when manufacturing such a tire 1A. Note that a wired bladder may be used to prevent the shoulder portions and the buttress portion from expanding, and a rigid core may be used when vulcanizing.

What is claimed is:

1. A method for manufacturing a pneumatic tire comprising the steps of:
    disposing a green tire of a pneumatic tire comprising
        a cylindrical annular structure being a band of metal,
        an unvulcanized rubber layer, which will become a tread portion, provided along the circumferential direction of the annular structure on an outer side of the annular structure, and
        a carcass portion including fibers covered with rubber, provided on at least both sides in a width direction of a cylindrical structure including the annular structure and the unvulcanized rubber layer,
    in a vulcanization mold having side plates and a sector, wherein the sector and the side plate are split at a split position on an outer side in a width direction of the annular structure;
        pressurizing a bladder inside the green tire after closing the side plates and prior to closing the sector; and
        sliding the sector adjacent to the side plates to close the mold and starting vulcanization,
    the split positions between the sector and the side plates on the outer side in the width direction of the annular structure define a width being not less than 80% and not more than 99.5% of the width of the annular structure.

2. The method for manufacturing a pneumatic tire according to claim 1, wherein the annular structure is embedded in the unvulcanized rubber layer and is not exposed from a surface on an outer side in the radial direction of the unvulcanized rubber layer.

3. The method for manufacturing a pneumatic tire according to claim 2, wherein, in a meridian cross-section, each of both edges of a tread surface of the vulcanized rubber layer in the width direction includes an arc recessed toward an inner side of the pneumatic tire.

4. The method for manufacturing a pneumatic tire according to claim 1, wherein, in a meridian cross-section, each of both edges of a tread surface of the vulcanized rubber layer in the width direction includes an arc recessed toward an inner side of the pneumatic tire.

5. The method for manufacturing a pneumatic tire according to claim 1, wherein an outer side of the unvulcanized rubber layer and a surface on the outer side in the radial direction of the annular structure, except portions where a groove is formed in the tread surface, have a substantially same form, and are substantially parallel.

6. The method for manufacturing a pneumatic tire according to claim 1, wherein the annular structure is made from a stainless steel material.

7. The method for manufacturing a pneumatic tire according to claim 6, wherein the stainless steel material is selected from at least one of a martensitic stainless steel, ferritic stainless steel, austenitic stainless steel, austenitic-ferritic two-phase stainless steel, and precipitation hardening stainless steel.

8. The method for manufacturing a pneumatic tire according to claim 1, wherein a pressure resistance parameter by which resistance against internal pressure of a gas with which the tire is filled is measured, and defined as a product of the tensile strength (MPa) and the thickness (mm) of the annular structure, is set to be not less than 200 and not more than 1,700.

9. The method for manufacturing a pneumatic tire according to claim 1, wherein the annular structure comprises a plurality of through-holes that penetrate an inner circumferential surface and an outer periphery thereof, a cross-sectional area of one of the through-holes being not less than 0.1 mm$^2$ and not more than 100 mm$^2$.

10. The method for manufacturing a pneumatic tire according to claim 9, wherein a form of the through-holes is circular or elliptical with an equivalent diameter 4×A/C of the through-holes of not less than 0.5 mm and not more than 10 mm, where C is a circumferential length of the through-holes, and A is the opening area of the through-holes.

11. The method for manufacturing a pneumatic tire according to claim 9, wherein a sum of the area of the through-holes is not less than 0.5% and not more than 30% of a surface area of the outer side in the radial direction of the annular structure.

12. The method for manufacturing a pneumatic tire according to claim 1, wherein:
   a distance between the surface on the outer side in the radial direction of the annular structure and the outer side of the rubber layer is not less than 3 mm and not more than 20 mm; and
   an annular structure width in the width direction of the annular structure is not less than 50% and not more than 95% of the total tire width.

13. The method for manufacturing a pneumatic tire according to claim 1, wherein an outer side of the unvulcanized rubber layer and a surface on the outer side in the radial direction of the annular structure, except portions where a groove is formed in the tread surface, have a substantially same and parallel form, parallel to a center axis of the rubber layer.

14. The method for manufacturing a pneumatic tire according to claim 1, wherein, in a meridian cross-section, each of both edges of a tread surface of the vulcanized rubber layer in the width direction includes an arc recessed toward an inner side of the pneumatic tire, the arc comprising a center located in an outside of the tire, and a curvature radius of the arc being not less than 3 mm and not more than 150 mm.

15. The method for manufacturing a pneumatic tire according to claim 1, wherein pressurizing the bladder inside the green tire after closing the side plates and prior to closing the sector comprises raising a pressure of the bladder 0.2 MPa to 2.0 MPa.

16. The method for manufacturing a pneumatic tire according to claim 1, wherein the side plates are continuous donut-like disks disposed vertically.

17. A method for manufacturing a pneumatic tire comprising the steps of:
   disposing a green tire of a pneumatic tire comprising
      a cylindrical annular structure being a band of metal,
      an unvulcanized rubber layer, which will become a tread portion, provided along the circumferential direction of the annular structure on an outer side of the annular structure, and
      a carcass portion including fibers covered with rubber, provided on at least both sides in a width direction of a cylindrical structure including the annular structure and the unvulcanized rubber layer,
   in a vulcanization mold having side plates and a sector, wherein the sector and the side plate are split at a split position on an outer side in a width direction of the annular structure;
   pressurizing a bladder inside the green tire after closing the side plates and prior to closing the sector; and
   sliding the sector adjacent to the side plates to close the mold and starting vulcanization,
   wherein a width of the annular structure is smaller than a width of the tread portion; and
   wherein the split positions between the sector and the side plates on the outer side in the width direction of the annular structure define a width being not less than 80% and not more than 99.5% of the width of the annular structure.

* * * * *